US 6,389,285 B1

(12) United States Patent
Escamilla et al.

(10) Patent No.: US 6,389,285 B1
(45) Date of Patent: May 14, 2002

(54) HANDOVER DETERMINATION IN A MOBILE COMMUNICATIONS SYSTEM

(75) Inventors: Javier Escamilla, Madrid; Javier Munoz Vidal, Valenica; Pedro Guerediaga Escribano, Castellon, all of (ES)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/330,924

(22) Filed: Jun. 14, 1999

(30) Foreign Application Priority Data

Jun. 17, 1998 (GB) .............................................. 9812993

(51) Int. Cl.[7] .................................................. H04Q 7/20
(52) U.S. Cl. ...................................... 455/438; 455/525
(58) Field of Search .......................... 455/436, 438–442, 455/423, 525, 226.2, 226.3; 370/331, 332

(56) References Cited

U.S. PATENT DOCUMENTS 5,648,955 A * 7/1997 Jensen et al. ............... 455/38.3
5,740,537 A * 4/1998 Beming et al. ............. 455/450
6,249,683 B1 * 6/2001 Lundby et al. ............. 455/522

FOREIGN PATENT DOCUMENTS

| EP | 0625863 A2 | * 11/1994 |
| ES | 8704052 | * 12/1985 |

* cited by examiner

Primary Examiner—Vivian Chin
Assistant Examiner—Eliseo Ramos-Feliciano
(74) Attorney, Agent, or Firm—John B. MacIntyre; Lalita P. Williams

(57) ABSTRACT

A self-adaptive handover determination device (5) functions by taking into account by how much a handover threshold is exceeded based on a received quality or signal strength measurement. Averaged signal measurements are compared (7) with a first threshold (8) and those exceeding it are summed (9) and further compared (10) with a second threshold (11) which sets the handover trigger level. The invention has the advantages of a reduced call drop rate and of enabling a fast handover when the communication's link suffers a rapid deterioration in quality.

7 Claims, 2 Drawing Sheets

HANDOVER DETERMINATION IN A MOBILE COMMUNICATIONS SYSTEM

FIELD OF THE INVENTION

This invention relates to mobile communications systems, and particularly to means for determining handover in such a system.

BACKGROUND OF THE INVENTION

One particular type of mobile communication system is a cellular radio telephone system. Cellular radio telephone systems generally include a switch controller coupled to the public switched telephone network (PSTN) and a plurality of base stations. One or more mobile stations communicate with a base station that facilitates a call between the mobile station and the PSTN. The communication link over a carrier signal from the base station to a mobile station is referred to as the downlink. Conversely, the communication link from a mobile station to the base station is referred to as the uplink.

A particular type of cellular radio telephone system is the GSM system (Global System for Mobile Communications), a description of which can be found in the book "The GSM System for Mobile Communications" by M. Mouly and M. Pautet.

GSM networks generally include mobile services switching centres, base stations, and mobiles stations. Each of the plurality of base stations generally defines a geographic region or "cell" proximate to the base station to produce coverage areas.

As the mobile station moves from one cell to the next, the communication link is transferred from its current base station to a neighbouring base station using a procedure known as handover or handoff. The need for handover is usually determined on the basis of one or more criteria. Commonly used criteria are received signal strength indication (RSSI) of the mobile station at the base station, the distance from the current base station as determined by the round trip time for signals to and from the mobile station and bit error rate (BER).

There is a variety of methods by which a handover process can be initiated. Firstly, processes for initiating handover may make measurements on the uplink and downlink between the mobile station and the base station and initiate handover when received signal levels, received quality levels or the timing advance (based on the round trip time) values separately exceed thresholds. Alternatively, processes for initiating handover may compare measurements of received signal strength with received quality to deduce that bad quality may be the result of interference. Further, processes for initiating handover may additionally make measurements from a number of neighbour cells and initiate handover based on the relative level of the signal received from the serving cell and from the neighbour cells.

One feature which all of these known methods share, is that they only take into account whether or not a fixed threshold has been exceeded and do not take account of how much the threshold has been exceeded. As threshold levels for triggering a handover are usually set (at each base station) on a per cell basis, for the worst expected case, there can be situations where handovers are triggered before they are necessary. This leads to the disadvantageous effect of decreasing the call-handling capacity of a cell, and of running the risk of a handover "ping-pong" effect where a call is repeatedly handed back and forth between cells unnecessarily. Conversely, in other situations, the triggering procedure takes too long and the call is dropped before handover can occur.

Another disadvantage of known methods is the complexity of the handover process. For example, four parameters need to be set in a database at the base station in order to manage a handover based on a quality measurement.

These parameters are hreqave (the number of received quality measurement samples to be averaged), hreqt (buffer size), "n" and "p", where "p" is the number of "n" consecutive averaged values which need to cross a set threshold in order to trigger a handover.

Thus there is a need for a means for triggering a handover which mitigates the above disadvantages.

SUMMARY OF THE INVENTION

In a first aspect, the present invention consists of a device for determining handover in a mobile communications system and comprises:

an averager for receiving measurements of a communications signal parameter and for computing an average of said measurements;

a first comparator for detecting when said average exceeds a first threshold;

a summer for computing a cumulative sum of averages exceeding the first threshold; and a second comparator for detecting when the cumulative sum exceeds a second threshold, thereby to generate a handover trigger signal.

The device may be incorporated in a base station or in a mobile station.

In a second aspect, the present invention consists of a method for determining handover in a mobile communications system including the steps of:

receiving measurements of a communications signal parameter and computing an average of said measurements;

determining if an average exceeds a first threshold;

summing those average values which exceed the first threshold to produce a cumulative sum; and determining if the cumulative sum exceeds a second threshold, thereby facilitating generation of a handover trigger signal.

The signal parameters may comprise, for example, quality, interference, received RF level or measurements relating to the distance between the base station and the mobile station, i.e., the timing advance.

The summer may apply a weighting factor to the average values exceeding the first threshold depending upon the type of parameter being used.

The invention is applicable to macro cell, micro cell and pico cell configurations, for example.

Further, it is not limited to use solely with the GSM cellular system.

The invention thus takes into account the variations in received signal level, thereby facilitating self-adaptive handovers. Handovers can be controlled to be as fast or as slow as needed.

Another advantage is that of simplification because handover parameters can be defined at a network level rather than a cell level. Further, only one measured parameter need be used for the entire network along with "hreqave", the number of samples to be averaged, thus reducing the complexity compared with the known systems.

In particular, for handovers based on quality measurements, micro cells (i.e. lower layer cells) can support more calls because the relevant parameters do not need to be set up for the worst case. Instead, handovers are triggered depending on the degree of quality degradation i.e. the worse the quality, the quicker the handover. Thus, call drop rate is reduced.

BRIEF DESCRIPTION OF THE DRAWINGS

Some embodiments of the invention will now be described, by way of example only, with reference to the drawings of which.

DESCRIPTION OF A PREFERRED EMBODIMENT

Figure 1:
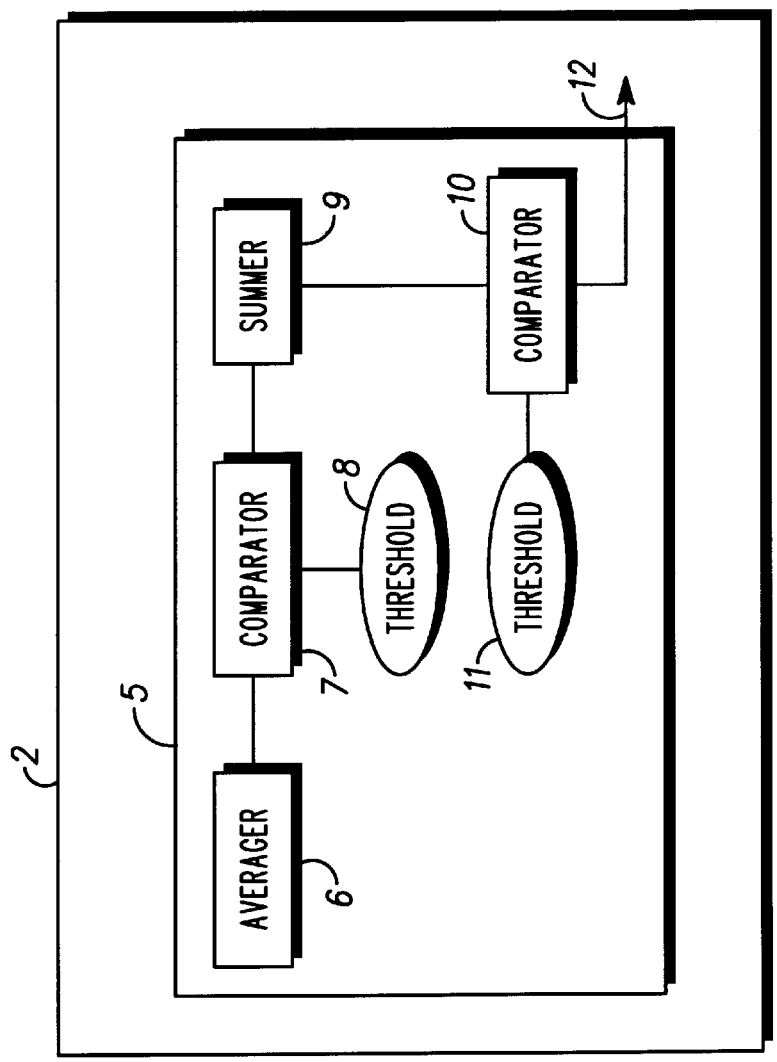
FIG. 1 is a schematic block diagram of a handover device in accordance with the invention and incorporated in a mobile cellular network.
Figure 1:
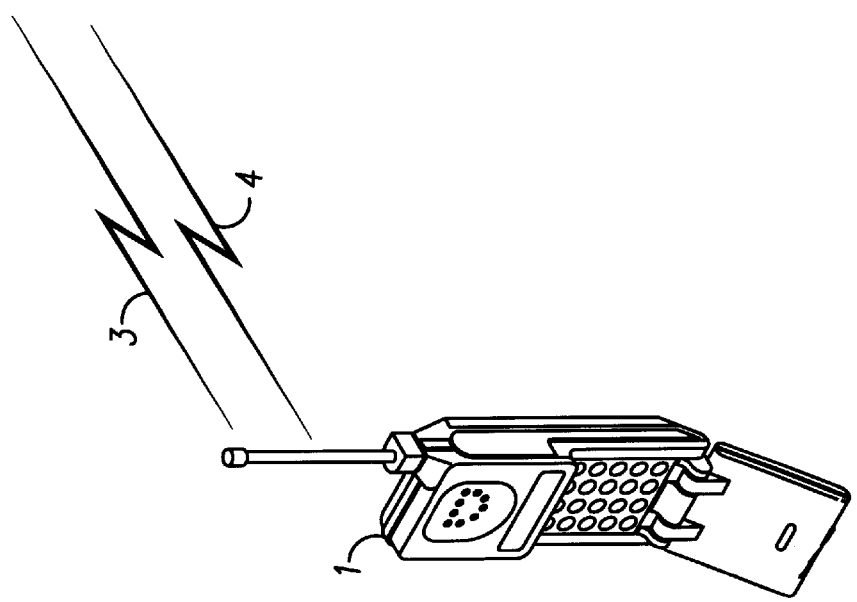

Referring to FIG. 1, a mobile station 1 communicates with a base station 2 in the known manner. In particular, uplink signals 3 include a measurement of the signal quality RXQUAL and signal level RXLEV received by the mobile station 1 from the base station 2 over a downlink 4.

The base station 2 includes, in addition to its usual constituents, a handover determining device 5 in accordance with the invention. The device 5 comprises an averager 6 for averaging consecutive samples of either of the aforesaid measurements.

The output of the averager at 6 is connected to the input of a first comparator 7 for comparing the average values of consecutive samples with a first stored threshold 8. The output of the first comparator 7 is connected to the input of a summer 9 which sums the average values which exceed the first threshold. The output of the summer 9 is connected to an input of a second comparator 10 which detects when the output of the summer 9 exceeds a second stored threshold 11.

The output of the second comparator 10 on line 12 is used to trigger a handover.

The device of FIG. 1 operates as follows. In accordance with the invention, as soon as one of the averaged samples exceeds the first threshold 8, a summing operation with the difference between the averaged sample and this threshold is commenced. If the subsequent averaged sample is also over the first threshold, then its difference with the first threshold is added to the previous difference. If it is equal to or below the threshold, the cumulative sum is reset and the summing operation will not start again until another sample over the first threshold arrives. Then the sum with the difference between the averaged sample and the first threshold is recommenced.

If several consecutive samples over the first threshold arrive, the cumulative sum increases, and when a predefined second threshold 11 for the cumulative sum is exceeded a handover is triggered. The larger the values of the samples, the greater the differences with the first threshold and so the quicker the trigger signal is produced because the cumulative sum increases more quickly as well.

In a first example of a preferred embodiment, handover is based on RXQUAL measurements and hreqave is set to 2 (i.e. the number of consecutive samples to be averaged). The first threshold is set at 3 and the second at 7.

Whenever averaged RXQUAL values exceed 3, the difference between the averaged value and the threshold (3) is added to the cumulative sum. When the cumulative sum exceeds the second threshold (i.e. 7), the handover is triggered.

The decision process is as follows:
FOR (every average);
IF (averaged quality−first threshold>0);
THEN cumulative sum=cumulative sum+(averaged quality−first threshold);
ELSE cumulative sum=0.
IF (cumulative sum>second threshold);
THEN generate handover cause.

Figure 2:
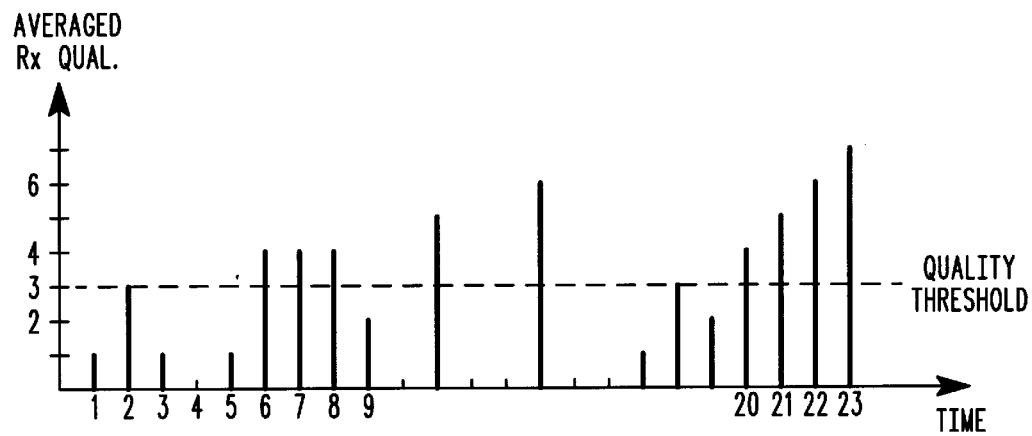
FIGS. 2 and 3 are graphs illustrating operation of two alternative embodiments.
Figure 2:
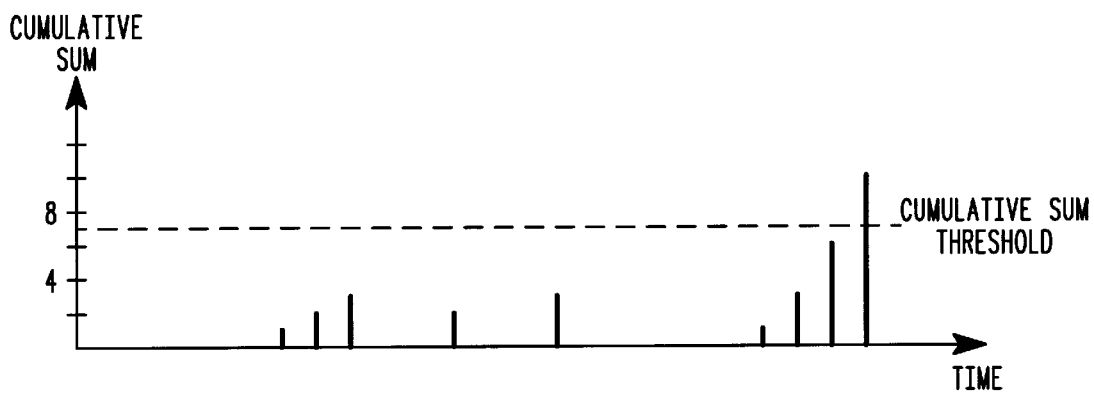

The upper half of the graph of FIG. 2 shows averaged sample RXQUAL values (from 1 to 23) over time, and having values ranging from RXQUAL=0 to 7. The first threshold is set at RXQUAL=3.

The lower half of the graph of FIG. 2 shows cumulative sum values with the second threshold set at value 7.

Considering as an example, the averaged samples labelled 1 to 5, none of these exceeds first threshold of 3. Therefore, the cumulative sum remains at 0.

However, averaged samples 6, 7 and 8 all exceed the first threshold by 1. Therefore, when the eighth averaged sample has been received, the cumulative sum is 3. Averaged sample number 9 is below the first threshold, therefore the cumulative sum is reset to 0 at this point. (Note that a reset point is arbitrary and could be set to a value other than 0, if desired).

Considering now averaged samples, 20, 21, 22 and 23, all of which are above the first threshold. The cumulative sum now builds up over time and as sample number 23 is received and processed, the sum exceeds the second threshold of 7, thus triggering a handover.

Contrasting this operation with known systems which typically would wait for 'p' out of 'n' consecutive averaged samples to equal or exceed an RXQUAL threshold before triggering a handover; the problem with this known arrangement is that a call can be dropped (i.e. lost) before the handover is actually triggered. The use of the second threshold applied to a cumulative sum in the present invention, enables rapid handover in situations where the signal is deteriorating rapidly. Therefore, there is much less risk of a call being dropped.

In a second example of a preferred embodiment, handover is based on RXLEV measurements. In this case, handovers are triggered when reported RXLEV averaged values are below a certain threshold.

The decision process is as follows:
FOR (every average);
IF (averaged level−first threshold<0).
THEN cumulative sum=cumulative sum+(first threshold−averaged level);
ELSE cumulative sum=0;
IF (cumulative sum>second threshold);
THEN generate handover cause.

Figure 3:
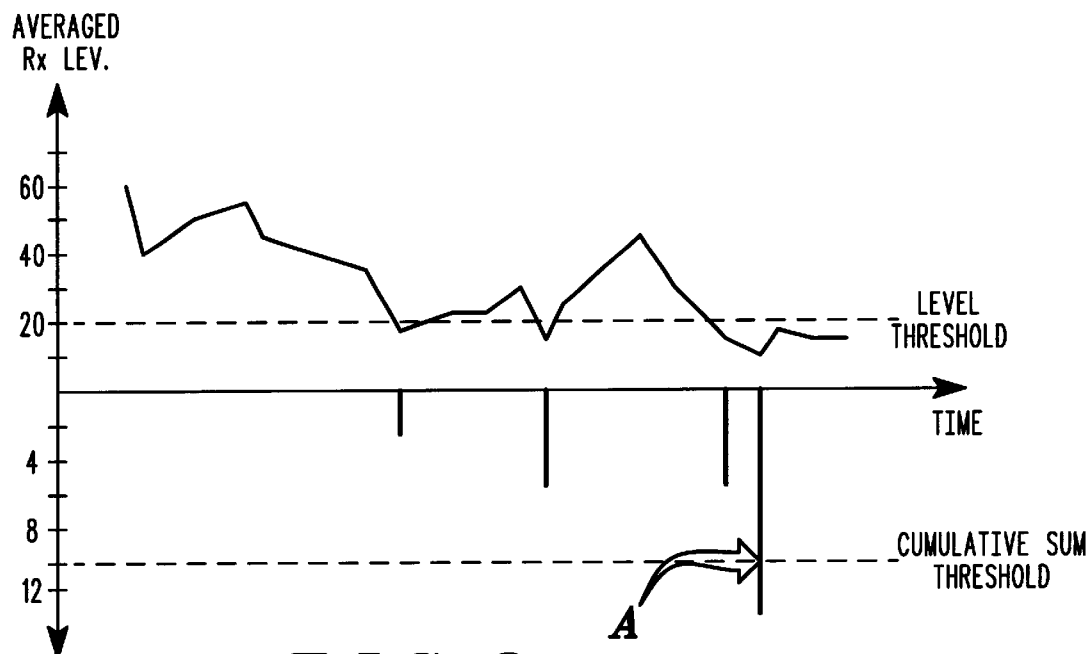

In FIG. 3, the upper half of the graph shows the averaged RXLEV over time and the first threshold value set at 20. When the cumulative sum, shown in the lower half of the graph, exceeds the second threshold (of 10) a handover is triggered (at point A).

In both embodiments, the number of samples taken into account (hreqave) when computing the averaged sample value is arbitrary and can be set as desired to take into account various link conditions (such as false effects due to fading).

We claim:

1. A device for determining handover in a mobile communications system and comprising:

an averager for receiving measurements of a communications signal parameter and for computing an average of said measurements;

a first comparator, connected to an output of said averager, for detecting when said average exceeds a first threshold;

a summer, connected to an output of said first comparator, for computing a cumulative sum of amounts by which successive average values exceed the first threshold and for resetting the cumulative sum if a computed average value is equal to or less than the first threshold; and a second comparator connected to an output of said summer for detecting when the cumulative sum exceeds the second threshold, thereby to generate a handover trigger signal.

2. A device according to claim 1 in which the signal parameter comprises a signal quality measurement.

3. A device according to claim 1 in which the signal parameter comprises a signal level measurement.

4. A device according to claim 1 in which the signal parameter comprises a measurement of interference.

5. A device according to claim 1 in which signal parameter comprises a measurement relating to the distance between the device and a remote transmitter.

6. A method for determining handover in a mobile communications system and including the steps of:

receiving measurements of a communications signal parameter and computing an average of said measurements;

determining if an average exceeds a first threshold;

summing those average values which exceed the first threshold to produce a cumulative sum of amounts by which successive average values exceed the first threshold;

resetting the cumulative sum if a computed average value is equal to or less than the first threshold; and determining if the cumulative sum exceeds a second threshold, thereby facilitating generation of a handover trigger signal.

7. A method according to claim 6 and including the further step of applying a weighting factor to the average values exceeding the first threshold.

* * * * *